(12) United States Patent
Cioeta et al.

(10) Patent No.: US 8,079,303 B2
(45) Date of Patent: Dec. 20, 2011

(54) LID WITH PERMANENT VACUUM LAYER AND VENTILATION CHANNELS

(75) Inventors: Daniela Cioeta, Latina (IT); Lorena Vecchini, Latina (IT)

(73) Assignee: Opinion Leaders S.r.l., Latina (IT)

( * ) Notice: Subject to any disclaimer, the term of this patent is extended or adjusted under 35 U.S.C. 154(b) by 948 days.

(21) Appl. No.: 11/587,848

(22) PCT Filed: Apr. 19, 2005

(86) PCT No.: PCT/IT2005/000225
§ 371 (c)(1),
(2), (4) Date: Oct. 27, 2006

(87) PCT Pub. No.: WO2005/104917
PCT Pub. Date: Nov. 10, 2005

(65) Prior Publication Data
US 2008/0022862 A1 Jan. 31, 2008

(30) Foreign Application Priority Data
Apr. 30, 2004 (IT) .............................. RM2004A0209

(51) Int. Cl.
*A01F 25/08* (2006.01)
(52) U.S. Cl. ............ 99/646 R; 99/403; 99/410; 99/413; 99/422; 99/646 C; 220/573.1; 220/573.4; 220/23.88; 126/373.1; 126/390.1
(58) Field of Classification Search ............. 99/403, 99/410, 413, 422, 646 C; 220/573.1, 573.4, 220/23.88; 126/373.1–390.1, 25 R
See application file for complete search history.

(56) References Cited

U.S. PATENT DOCUMENTS

| | | | | |
|---|---|---|---|---|
| 626,808 A | * | 6/1899 | Gurney | 220/369 |
| 687,194 A | * | 11/1901 | Bustin et al. | 215/23 |
| 1,740,223 A | * | 12/1929 | Burvenick | 220/568 |
| 2,127,988 A | * | 8/1938 | Tarrant | 126/384.1 |
| 2,415,613 A | * | 2/1947 | Sulak | 220/231 |
| 3,279,452 A | * | 10/1966 | Hottenroth et al. | 126/25 R |
| 3,428,236 A | | 2/1969 | Bidwell | |
| 3,756,220 A | * | 9/1973 | Tehrani et al. | 210/167.11 |
| 4,091,956 A | * | 5/1978 | Vecchio | 220/231 |
| 4,482,077 A | * | 11/1984 | Henderson | 220/374 |
| 5,596,921 A | * | 1/1997 | Kuwana et al. | 99/340 |
| 5,687,704 A | * | 11/1997 | Lerch et al. | 126/25 R |
| 5,772,017 A | * | 6/1998 | Kang | 206/222 |

(Continued)

FOREIGN PATENT DOCUMENTS

DE 8715308 * 7/1988

(Continued)

*Primary Examiner* — Henry Yuen
*Assistant Examiner* — Brett Spurlock
(74) *Attorney, Agent, or Firm* — Young & Thompson

(57) ABSTRACT

An improved lid (1) for covering containers for cooking foods (2), includes elements for cooling vapor (3) placed outside and above the lid (1), and support elements (4) for the vapor cooling elements (3). The lid has an extension in the thickness direction so as to provide a plurality of channels (11) through the lid. The channels (11) define a passage path for the vapor coming from the container (2) for cooking the foods outward, causing an acceleration of the vapor, the accelerated vapor contacting through the channels (11) a lower surface (31) of the vapor cooling elements, condensing and flowing again, at a liquid phase, inside the cooking container (2) through the plurality of channels (11).

18 Claims, 1 Drawing Sheet

U.S. PATENT DOCUMENTS

| | | | |
|---|---|---|---|
| 6,129,234 A * | 10/2000 | Culig et al. | 220/573.1 |
| 6,159,513 A * | 12/2000 | Judlowe et al. | 426/115 |
| 6,305,272 B1 * | 10/2001 | Lin | 99/371 |
| 6,626,092 B2 * | 9/2003 | Tarlow | 99/472 |
| 2002/0040711 A1 | 4/2002 | Anthony | |
| 2004/0187700 A1 * | 9/2004 | Tippmann | 99/410 |
| 2004/0216620 A1 * | 11/2004 | Quiggins et al. | 99/413 |

FOREIGN PATENT DOCUMENTS

| | | | |
|---|---|---|---|
| EP | 1745727 A1 * | 1/2007 | |
| GB | 2 139 077 | 11/1984 | |
| GB | 2139077 A * | 11/1984 | |
| JP | 2004033345 A * | 2/2004 | |
| KR | 2004099496 * | 12/2004 | |

* cited by examiner

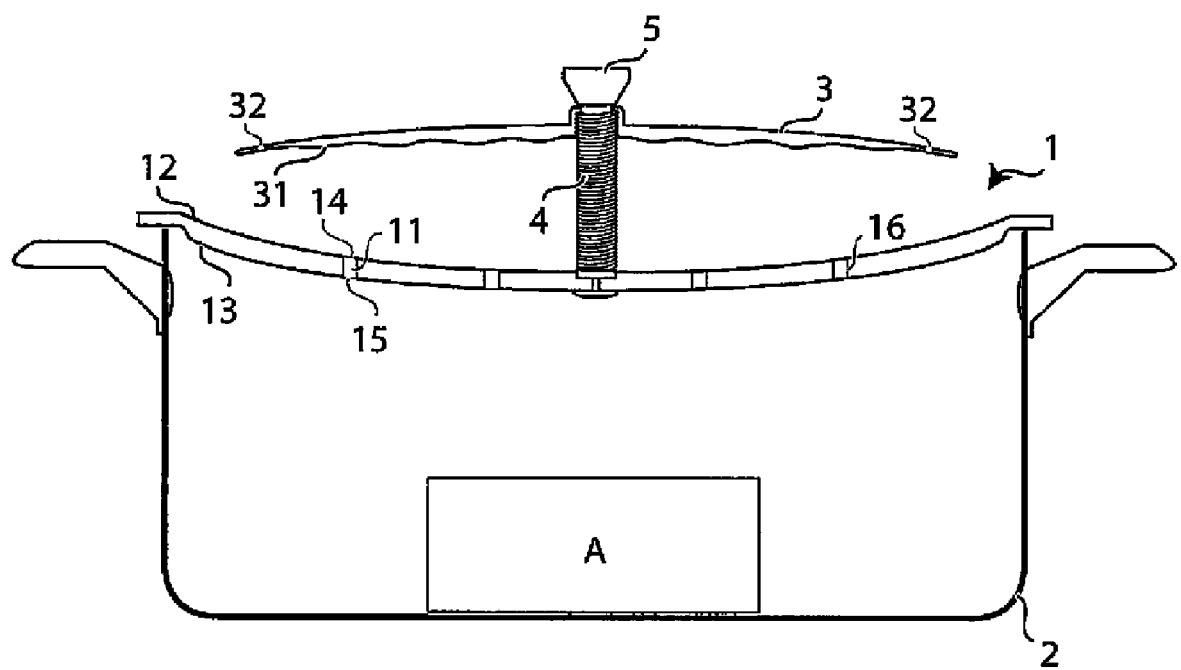

LID WITH PERMANENT VACUUM LAYER AND VENTILATION CHANNELS

BACKGROUND OF THE INVENTION

The present invention concerns an improved lid for cooking foods.

More specifically, the invention concerns a lid particularly to recover the nutritional properties of foods containing saturated vapor deriving from cooking the food.

DESCRIPTION OF THE RELATED ART

At present, foods cooked at home are cooked using gas, this cooking not always being uniform.

Particularly, if foods are cooked at an excessive temperature, most organoleptic properties are degrade and lost.

In order to solve this problem, lids exist providing holes for venting saturated vapor.

This venting provides for cooking food at low temperature, with a uniform distribution of the heat inside the pot, by natural convective motion.

The above allows recovering the vapor phase transformed into liquid phase, thus preventing the food from passing 100 degree C., and preventing the degradation of vitaminic, proteinic and lipidic components.

However, in these kind of systems, vapor from cooking employing such lids exits under pressure from the cooking container, thus dispersing nutritive properties of the foods into the environment.

In other words, such lids cause a high loss of food properties.

SUMMARY OF THE PRESENT INVENTION

In view of the above, the present invention provides a lid allowing a cooking of the foods without losing quality of the cooked foods and allowing the cooking at not too high temperatures.

Thus, the object of the present invention is providing a lid allowing at the same time i) containing the heat dispersion, ii) promoting the ordered and accelerated outlet of vapors from a cooking container through outlet paths having a suitable shape and housing, and iii) conveying and controlling production of these vapors in such a way they fall down condensed inside the cooking pot.

It is therefore a specific object of the present invention to provide an improved lid for covering containers for cooking foods, comprising means for cooling vapor placed outside and above the lid, and support means for the vapor cooling means, with an extension in the thickness direction so as to realize a plurality of channels through the lid, the channels realizing a passage path for the vapor coming from the container for cooking the foods outward, causing an acceleration of the vapor, the accelerated vapor contacting through the channels a lower surface of the vapor cooling means, condensing and flowing again, at a liquid phase, inside the cooking container through the plurality of channels.

The lid can be comprised of two layers, coupled in correspondence of the edges, the layers realizing an interspace suitable to thermally insulating the inner part of the cooking container.

Furthermore, according to the invention, the two layers can be coupled by the channels.

According to the invention, the lid can be solid.

The channels can have a cylindrical profile or it can be preferably profiled.

Furthermore, according to the invention, the lid can be convex.

Still according to the invention, the cooling means can comprise a plate that, preferably, can be concave.

Furthermore, according to the invention, the plate can provide an undulated and/or lamellar lower surface and some holes, preferably provided on the edge, to promote condensation of vapor.

The support means of the cooling means can be adjustable.

Preferably, the lid can comprise a knob, on the top of the support means for the cooling means.

Furthermore, the cooling means can be housed in the lower part of the knob.

BRIEF DESCRIPTION OF THE DRAWING FIGURE

The sole FIGURE illustrates the invention in cross section.

BRIEF DESCRIPTION OF THE PREFERRED EMBODIMENT

The present invention is described, for illustrative but not limitative purposes, according to its preferred embodiment, with particular reference to the drawing FIGURE, showing a section view of a pot or other cooking container, on which the inventive lid is placed.

In order to better understand the present invention, the operation modes of the preferred embodiment of the lid will be described in the following, similar modes being valid for other embodiments.

Making reference to the FIGURE, it can be seen the application of the lid, generically indicated by reference number 1, on a pot or cooking container 2, within which the food A to be cooked is contained.

Channels 11 are present on the upper surface 12 of the lid 1, communicating the inside of the pot or cooking container 2 with the surrounding environment.

Observing now in greater detail the FIGURE, the lid 1 in this embodiment provides respectively an upper surface 12 and a lower surface 13, comprised of two metallic layers, suitably spaced and coupled along the edges, curved in such a way to present the convex surface inside the pot or cooking container 2.

Holes 14, 15 are present on both the layers 12, 13, creating channels 11.

The holes 14, 15 have a suitable diameter, and their positioning on the surfaces 12 or 13 describes in the present embodiment a circumference with the center coinciding with the center of the lid 1.

A lid-cover 3 is provided above the lid.

Saturated vapors produced by the food "A" during the cooking pass through the channels 11, being subjected to an acceleration outward the pot or cooking container 2.

The saturated vapors exiting from the channels 11 meet the lid-cover 3, contacting which are subjected to a condensation, in view of the fact that the lid-cover 3 has a lower temperature.

Consequently, recover of nutritional substances is obtained, said the condensed substances passing through the same channels 11, going back inside the pot or cooking container 2.

Lid 1, in the embodiment shown, forms a vacuum chamber between the upper and lower surfaces 12, 13 in order to thermally insulate the cooking zone with respect to the outside environment.

This allows having an easy handling of the lid 1, the lid being hollow and light.

The outer surface of the channels 11 is comprised of cylindrical elements 16.

The cylindrical elements 16 can also have a shape different from the cylindrical shape, such as a profile that, starting from the outer layer 12 toward the inner layer 13, is initially converging and then diverging.

These channels 11 have the function of orderly capturing and accelerating the outlet speed of cooking vapors by Venturi effect.

This effect can be obtained both for cylindrical channels 11 and with channels having the above converging—diverging profile.

In case of cylindrically shaped channels 11, a neck is obtained between the inner volume of the pot or cooking container 2, within which the saturated vapor is contained at high pressure, and the outside environment at atmospheric pressure.

If the channels 11 are realized with a converging—diverging profile, a further improvement of the above effect is obtained.

Saturated vapors exiting under pressure from the pot or cooking container 2 meet the lower surface 31 of the lid-cover 3, having a suitable concave shape.

The lid-cover 3 has the function of condensing the cooking vapors arriving from the underlying channels.

Condensate created by the saturated vapors accumulates on the lower surface 31 and then slides on the upper surface 12 of the lid 1.

Convexity of the upper surface 12 of the lid 1 provided in the preferred embodiment, promotes the collection of the condensate and outflow of liquid substances inside the pot or cooking container 2 by the channels 11.

Lower surface 31 of the lid-cover 3 has an undulated profile so as to increase the surface met by the saturated vapor, thus increasing the condensation effect of the lid-cover 3.

Furthermore, lid-cover 3 provides, in the embodiment shown, also holes 32, preferably realized in correspondence of the edge, to separate the condensate droplets and making easier the return of the bigger production of liquid phase thus promoting the maintenance of the nutritional aspects of the food.

In order to regulating the condensate quality and to adapt the same to specific cooking needing, a screw 4 has been introduced as coupling between the lid 1 and the lid-cover 3, in order to be able to vary the distance between the two elements.

This solution can be used for foods requiring a different cooking time, with a higher or lower recover of cooking liquids, or to adjust the condensate quality in function of the higher or lower production of vapor.

A knob 5 is present above the screw 4, the knob being comprised of not-conductive material, to move the lid 1 also during the cooking of the foods.

On the basis of the above specification, it can be observed that the basic feature of the present invention is the realization of a lid for a food cooking container, the lid having a thickness through which profiled or not, channels are realized, for acceleration by Venturi effect of saturated vapor arriving under pressure from the pot or cooking container, the vapor being then condensed by cooling means and introduced again within the pot or cooking container by the same channels, in order to recover the nutritional substances.

An advantage of the present invention is the thermal insulation effect of the lid obtained by its two-layer structure.

Another advantage of the present invention is that of being able to adjust the height by cooling means to regulate the cooking of the food.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. Improved lid assembly for covering a food cooking container, comprising:
   a lid defined by
   i) a lid lower surface layer configured to be placed on an upper edge surface of the cooking container, the lid lower surface layer having an outer perimeter edge,
   ii) a lid upper surface layer having an outer perimeter edge, a lowermost surface of said lid upper surface layer being spaced apart from an opposite uppermost surface of the lid lower surface by an interspace located therebetween, the lid upper surface layer having an outer perimeter edge,
   the lid lower surface layer and the lid upper surface layer being coupled in correspondence at the outer perimeter edges, and wherein the interspace between the lid lower surface layer and the lid upper surface layer defines a vacuum chamber
   iii) plural channels present on the lid upper surface layer, wherein with the lid located on the cooking container within which food is being cooked, the channels communicate an interior part of the cooking container with the surrounding outside environment, each channel is created by a pair of holes located respectively on the lid lower and upper surface layers, an outer surface of each channel being comprised of a cylindrical element having a profile starting from the lid upper surface layer extending to the lid lower surface layer, the channels providing passage paths capturing and accelerating an outlet speed of cooking vapors from the interior part of the cooking container into a vapor condensing space located above the lid upper surface layer, wherein the interspace defined between the uppermost surface of said lid lower surface layer and the lowermost surface of said lid upper surface layer defines therebetween a thermally insulating space insulating the interior part of the cooking container from an exterior of the cooking container;
   a vapor cooling means comprised of a lid-cover located outside the cooking container and above said lid; and
   a support element supporting said lid-cover above said lid, wherein,
   the vapor condensing space is defined between a lower surface of the lid-cover and the lid upper surface layer,
   the lower surface of the lid-cover being in vertical registration with the channels,
   vapor coming from the interior part of the cooking container are accelerated through said channels to a lower surface of said lid-cover, contact with the lower surface of the lid-cover condensing the vapor, and the condensed vapor flowing again, at a liquid phase, into said cooking container through said channels.

2. The lid assembly according to claim 1, wherein said channels have a cylindrical profile.

3. The lid assembly according to claim 1, wherein said lid is convex when viewed from the interior part of the cooking container.

4. The lid assembly according to claim 1, wherein said lid-cover comprises a plate.

5. The lid assembly according to claim 4, wherein plate is concave when viewed from the interior part of the cooking container.

6. The lid assembly according to claim 4, wherein said plate provides an undulated lower surface.

7. The lid assembly according to claim 4, wherein said plate provides a lower lamellar surface.

8. The lid assembly according to claim 4, wherein said plate comprises some holes.

9. The lid assembly according to claim 1, wherein said support element is adjustable.

10. The lid assembly according to claim 1, wherein said support element comprises a screw.

11. The lid assembly according to claim 1, wherein said lid comprises a knob, on the top of said support element.

12. The lid assembly according to claim 11, wherein said lid-cover is housed in a lower part of said knob.

13. The lid assembly according to claim 4, wherein said plate comprises some holes located at an edge of the plate.

14. The lid assembly according to claim 1, wherein the interspace between the uppermost surface of the lid lower surface layer and the lowermost surface of the lid upper surface layer defines a chamber.

15. The lid assembly according to claim 1, wherein the interspace extends from at least one of the plural channels to the outer perimeter edges of the lower and upper surface layers.

16. The lid assembly according to claim 1, wherein the interspace surrounds plural of the channels.

17. Improved lid assembly for covering a food cooking container, comprising:
a lid defined by
i) a lid lower surface layer configured to be placed on an upper edge surface of the cooking container, the lid lower surface layer having an outer perimeter edge,
ii) a lid upper surface layer having an outer perimeter edge, a lowermost surface of said lid upper surface layer being spaced apart from an opposite uppermost surface of the lid lower surface by an interspace located therebetween, the lid upper surface layer having an outer perimeter edge,
the lid lower surface layer and the lid upper surface layer being coupled in correspondence at the outer perimeter edges, and wherein the interspace between the lid lower surface layer and the lid upper surface layer defines a vacuum chamber
iii) plural channels present on the lid upper surface layer, wherein with the lid located on the cooking container within which food is being cooked, the channels communicate an interior part of the cooking container with the surrounding outside environment, each channel is created by a pair of holes located respectively on the lid lower and upper surface layers, the holes of each pair of holes located o the lid lower and upper surface layers being vertically aligned with each other, an outer surface of each channel being comprised of a profiled element having, starting from the outer layer toward the inner layer, an initially converging and then diverging profile, and functioning by capturing and accelerating the outlet speed of cooking vapors by venturi effect, said channels realized for acceleration by venturi effect of saturated vapor arriving under pressure from the cooking container, the channels providing passage paths capturing and accelerating an outlet speed of cooking vapors from the interior part of the cooking container into a vapor condensing space located above the lid upper surface layer;
a vapor cooling means comprised of a lid-cover located outside the cooking container and above said lid; and
a support element supporting said lid-cover above said lid, wherein,
the vapor condensing space is defined between a lower surface of the lid-cover and the lid upper surface layer,
the lower surface of the lid-cover being in vertical registration with the channels,
vapor coming from the interior part of the cooking container are accelerated through said channels to a lower surface of said lid-cover, contact with the lower surface of the lid-cover condensing the vapor, and the condensed vapor flowing again, at a liquid phase, into said cooking container through said channels.

18. Improved lid assembly for covering a food cooking container, comprising:
a lid defined by
i) a lid lower surface layer configured to be placed on an upper edge surface of the cooking container, the lid lower surface layer having an outer perimeter edge, said lid lower surface being convex when viewed from an interior part of the cooking container,
ii) a lid upper surface layer having an outer perimeter edge, a lowermost surface of said lid upper surface layer being spaced apart from an opposite uppermost surface of the lid lower surface by an interspace located therebetween, the lid upper surface layer having an outer perimeter edge, the lid lower surface layer and the lid upper surface layer being coupled in correspondence at the outer perimeter edges, the interspace between the lid lower surface layer and the lid upper surface layer defining a vacuum chamber,
and
iii) plural channels present on the lid upper surface layer and on the lid lower surface layer, wherein with the lid located on the cooking container within which food is being cooked, the channels communicate the interior part of the cooking container with the surrounding outside environment, each channel is created by a pair of holes located respectively on the lid lower and upper surface layers, the holes of each pair of holes on the lid lower and upper surface layers being vertically aligned with each other, an outer surface of each channel being comprised of a cylindrical element having a profile starting from the lid upper surface layer extending to the lid lower surface layer, the channels providing passage paths capturing and accelerating an outlet speed of cooking vapors from the interior part of the cooking container into a vapor condensing space located above the lid upper surface layer, wherein the interspace defined between the uppermost surface of said lid lower surface layer and the lowermost surface of said lid upper surface layer defines therebetween a thermally insulating space insulating the interior part of the cooking container from an exterior of the cooking container;
a vapor cooling means comprised of a lid-cover located outside the cooking container and above said lid; and
a support element supporting said lid-cover above said lid, wherein,
the vapor condensing space is defined between a lower surface of the lid-cover and the lid upper surface layer,
the lower surface of the lid-cover being in vertical registration with the channels,
vapor coming from the interior part of the cooking container are accelerated through said channels to a lower surface of said lid-cover, contact with the lower surface of the lid-cover condensing the vapor, and the condensed vapor flowing again, at a liquid phase, into said cooking container through said channels.

* * * * *